(12) United States Patent
Braum et al.

(10) Patent No.: US 7,813,974 B1
(45) Date of Patent: Oct. 12, 2010

(54) METHOD AND APPARATUS FOR DUPLICATE SHIPMENT DETECTION

(75) Inventors: Roberta M. Braum, Seattle, WA (US); Jason Seung Jin Lee, Bellevue, WA (US); Felix F. Antony, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 186 days.

(21) Appl. No.: 11/694,569

(22) Filed: Mar. 30, 2007

(51) Int. Cl.
*G06Q 10/00* (2006.01)

(52) U.S. Cl. .................. 705/28; 700/219; 700/108; 700/115; 705/10; 235/385

(58) Field of Classification Search .............. 705/10, 705/28; 700/108, 213; 709/224; 340/521, 340/531; 235/375, 383, 385, 387, 487, 492, 235/472.01
See application file for complete search history.

(56) References Cited

U.S. PATENT DOCUMENTS

| | | | |
|---|---|---|---|
| 5,600,565 A * | 2/1997 | Wagner et al. .............. 700/219 |
| 5,900,610 A * | 5/1999 | Kelly, Jr. ..................... 235/385 |
| 6,193,160 B1 * | 2/2001 | Zembitski .............. 235/472.01 |
| 7,136,832 B2 | 11/2006 | Li et al. |
| 7,137,566 B2 | 11/2006 | Silverbrook et al. |
| 2005/0261935 A1 | 11/2005 | Silverbrook et al. |
| 2006/0293777 A1* | 12/2006 | Breitgand et al. .......... 700/108 |
| 2007/0215685 A1 | 9/2007 | Self et al. |
| 2007/0279214 A1* | 12/2007 | Buehler ...................... 340/521 |
| 2007/0282665 A1* | 12/2007 | Buehler et al. .............. 705/10 |
| 2007/0283004 A1* | 12/2007 | Buehler ...................... 709/224 |
| 2008/0011841 A1* | 1/2008 | Self et al. .................... 235/385 |

OTHER PUBLICATIONS

"Rep. David E. Price Holds a Hearing on the Container Security Intiative." Political Transcript Wire Mar. 8, 2007 ABI/INFORM Trade & Industry, ProQuest. Web. Jun. 1, 2010.*
Mikko Karkkainen, Timo Ala-Risku, and Kary Framling. "Efficient tracking for short-term multi-company networks." International Journal of Physical Distribution & Logistics Management 34.7/8 (2004): 545. ABI/INFORM Global, ProQuest. Web. Jun. 1, 2010.*
Hallie Forcinio. "Electronic article surveillance—source tag to smart tag." Pharmaceutical Technology Oct. 1, 2000: Pharmaceutical News Index, ProQuest. Web. Jun. 1, 2010.*

* cited by examiner

*Primary Examiner*—Matthew S Gart
*Assistant Examiner*—Olusegun Goyea
(74) *Attorney, Agent, or Firm*—Robert C. Kowert; Meyertons, Hood, Kivlin, Kowert & Goetzel, P.C.

(57) ABSTRACT

Method and apparatus for detecting duplicate shipments at one or more materials handling facilities in a distribution system. For each package processed at one or more downstream processing station(s), a destination identifier (customer/address combination) and one or more item identifiers for item(s) in the package may be obtained. An analysis of the obtained data may be performed in accordance with an analysis interval (e.g., thirty minutes or one hour). For every analysis interval, all destination-identifier/item-identifier combinations obtained in the analysis interval may be examined to determine the number of instances each destination-identifier/item-identifier combination occurred in aggregated data (a window, e.g. two weeks or one month of data). The number of destination-identifier/item-identifier combinations that have an occurrence count greater than a specified number may be counted, and if the sum is greater than a specified threshold, an alarm may be raised.

41 Claims, 10 Drawing Sheets

METHOD AND APPARATUS FOR DUPLICATE SHIPMENT DETECTION

BACKGROUND

Inventory of various types of items may be maintained and processed at materials handling facilities which may include, but are not limited to, one or more of: warehouses, distribution centers, cross-docking facilities, order fulfillment facilities, inventory rental facilities, packaging facilities, shipping facilities, factories, or other facilities or combinations of facilities for performing one or more functions of material (inventory) handling. For example, retailers, wholesalers, rental services, and other product distributors (which may collectively be referred to as distributors) typically maintain an inventory of various items that may be ordered by and shipped to clients or customers. As another example, manufacturers may maintain an inventory of parts and/or materials for use in manufacturing processes. These parts and/or materials may be ordered from inventory for packaging and delivery to manufacturing facilities.

In a materials handling facility, shipments to customers or clients may be duplicated during the order fulfillment process, for example due to human error, machine error, or a combination thereof. For example, a customer may order quantity N of a particular item to be shipped to an address. Due to some error, for example due to the order being printed twice, 2N of the item may be inadvertently shipped to the customer in multiple shipments or packages. A systemic problem may result in duplicate shipments being generated for many customers. It is also possible that one or more customers submit orders for excessive quantities of particular items, for example due to a pricing error by the distributor, thus generating many orders and shipments of the items to the customers. Fraud and theft are also possible; for example, a dishonest employee may intentionally attempt to ship particular items from inventory to him- or herself or to an accomplice.

SUMMARY

Various embodiments of a method and apparatus for detecting duplicate shipments in distribution systems are described. Embodiments may provide a duplicate shipment detection system that detects duplicate shipment generation at a materials handling facility and/or at two or more materials handling facilities in a distribution system. The duplicate shipment detection system may count the number of instances that a unique destination-identifier/item-identifier combination is fulfilled. An alarm may be triggered or raised if the number of instances exceeds a specified threshold. Response to an alarm generated by the duplicate shipment detection system may include, but is not limited to, stopping the sending of one or more shipments identified as containing duplicated units of items to customers. Embodiments of the duplicate shipment detection system may detect undesirable levels of duplicate shipments of items being sent to customers in a distribution system.

As used herein, the term item identifier refers to a unique identifier associated with each particular type of item carried in inventory of a distribution system. The term destination identifier may be used herein to refer to a unique customer/address combination to which one or more units of an ordered item are to be shipped. For each package processed at one or more downstream processing station(s), the destination identifier and one or more item identifiers for item(s) in the package may be captured. Other information that may be used to identify the package, such as a shipping identifier and/or package identifier, may also be captured. Capturing the destination-identifier/item-identifier information at the level of packages downstream in the order fulfillment processing stream may help to make the duplicate shipment detection system independent of other processes in the distribution system, such as the orders and shipments themselves.

The captured information may be sent to or collected by an aggregator component of the duplicate shipment detection system. The aggregator may insert the collected information into a duplicate shipment detection data store of some type, for example a database, which may be referred to herein as a duplicate shipment detection database. An analysis engine component of the duplicate shipment detection system may be configured to periodically or aperiodically perform an analysis of the collected data stored in the duplicate shipment detection database in accordance with an analysis interval, for example 30 minutes or one hour. The analysis may be performed on a most recent window of data, for example two weeks or one month of data. For every analysis interval of time, all destination-identifier/item-identifier combinations collected in the analysis interval may be examined to determine the number of instances each destination-identifier/item-identifier combination occurs in the aggregated data (the window, e.g. two weeks or one month). The number of destination-identifier/item-identifier combinations that have an occurrence count greater than a specified number may be counted, and if the sum is greater than a specified threshold, an alarm may be raised. In one embodiment, the specified number to which the occurrence count is compared is one. In other embodiments, the specified number may be a number greater than one. In one embodiment, the specified number may be adjustable. In one embodiment, the specified threshold may be adjustable. In one embodiment, instead of counting the number of occurrences of destination-identifier/item-identifier combinations, the analysis engine may perform the count based on a single identifier, such as an address identifier. Other embodiments could be based on combinations of other numbers of various identifiers.

Embodiments may be used to collect and analyze duplicate shipment detection data at a single materials handling facility. Embodiments may also be used to aggregate and analyze duplicate shipment detection data collected at two or more materials handling facilities in distribution systems that include more than one materials handling facility. In a distribution system, a distributor may implement an embodiment of the duplicate shipment detection system at one or more materials handling facilities to detect duplicate shipments at each of the materials handling facilities. In one embodiment, these implementations may operate independently. In one embodiment, a distributor may implement an embodiment of the duplicate shipment detection system at the distribution system level that may collect package data from two or more materials handling facilities, and analyze the aggregated data to detect duplicate shipments that may occur across two or more of the materials handling facilities.

In one embodiment, the duplicate shipment detection system may operate independently of other materials handling facility and/or distribution system processes, such as upstream order fulfillment processes. The independence may be a logical independence, as the duplicate shipment detection system may share at least some physical aspects or components with the materials handling facility processes. The independence of the duplicate shipment detection system may be achieved by capturing destination-identifier/item-identifier information downstream in an order fulfillment processing stream such as the stream illustrated in FIG. 1, for example at a point in the stream when the items are packaged and the packages are being labeled or have already been labeled.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a method and apparatus for detecting duplicate shipments in distribution systems are described. In embodiments, a duplicate shipment detection system may be provided that counts the number of instances an identifier or a combination of two or more identifiers, such as a unique customer/address-item identifier combination, is fulfilled or processed. An alarm may be triggered, for example, if the number of instances exceeds a specified threshold and/or if the number of instances stays above a specified threshold for a specified period. Response to an alarm generated by the duplicate shipment detection system may include, but is not limited to, stopping the sending of one or more shipments identified as containing duplicate units of items to customers. Embodiments of the duplicate shipment detection system may detect undesirable levels of duplicate shipments of items being sent to customers in a distribution system. The distribution system may be a distribution system associated with a retailer, wholesaler, e-commerce business, rental service, manufacturer, parts or materials supplier, or any other type of product distributor that maintains an inventory of various items that may be ordered by and shipped to clients or customers.

Figure 1:
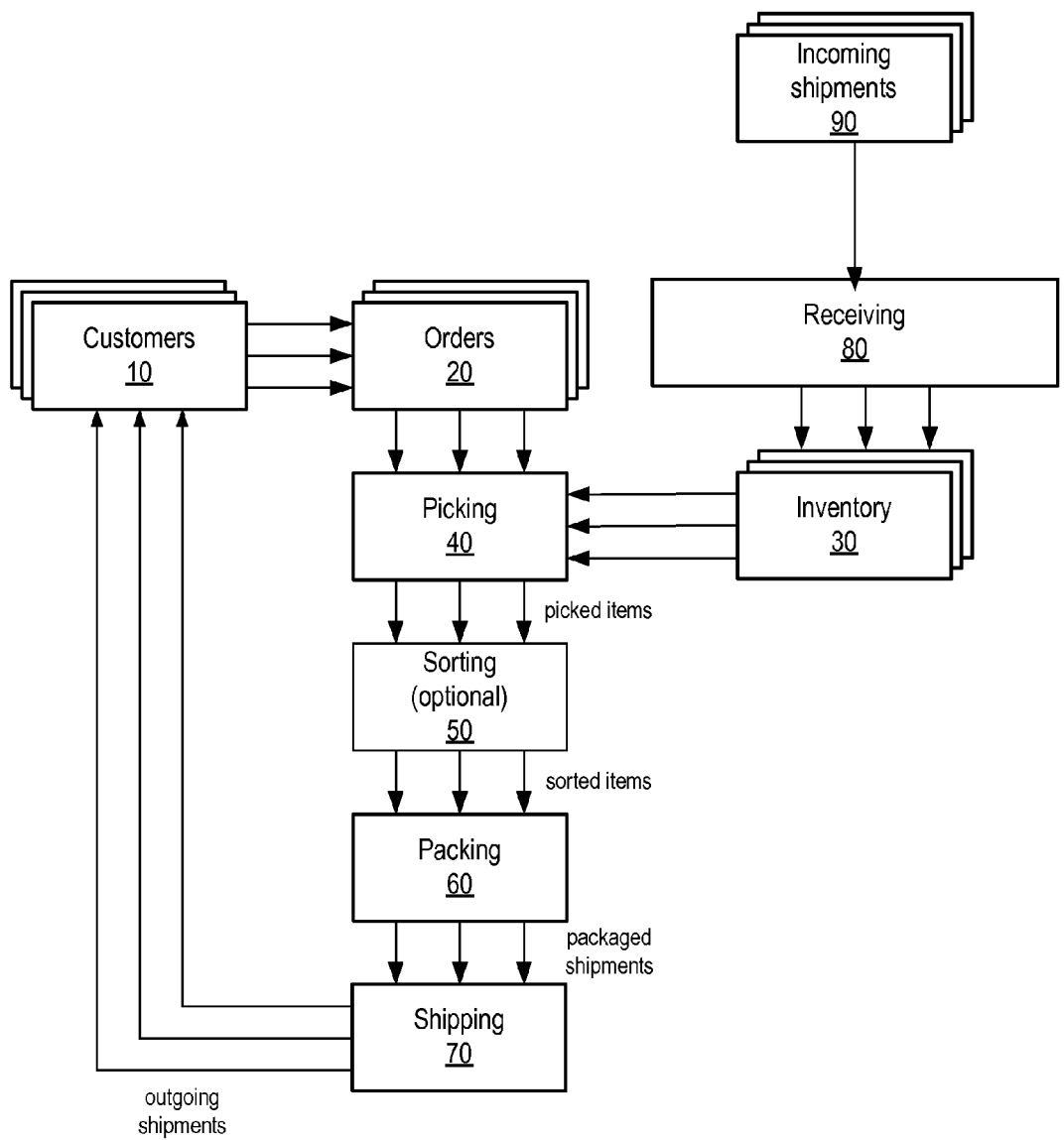
FIG. 1 illustrates a broad view of the operation of a materials handling facility in which a duplicate shipment detection system may be implemented, according to one embodiment.

FIG. 1 illustrates a logical representation or view of the operation of a materials handling facility in which embodiments of the duplicate shipment detection system may be implemented. For example, this Figure may illustrate an order fulfillment center of a product distributor. Multiple customers 10 may submit orders 20 to the product distributor, where each order 20 specifies one or more items from inventory 30 to be shipped to the customer that submitted the order. To fulfill the customer orders 20, the one or more items specified in each order may be retrieved, or picked, from inventory 30 (which may also be referred to as stock storage) in the materials handling facility, as indicated at 40. Picked items may be delivered or conveyed, if necessary, to one or more stations in the materials handling facility for (optional) sorting 50 into their respective orders, packing 60, and finally shipping 70 to the customers 10. A picked, packed and shipped order does not necessarily include all of the items ordered by the customer; an outgoing shipment to a customer may include only a subset of the ordered items available to ship at one time from one inventory-storing location.

A materials handling facility may also include a receiving 80 operation for receiving shipments of stock from one or more sources (e.g., vendors) and for placing the received stock into stock storage. The receiving 80 operation may also receive and process returned purchased or rented items or orders from customers. At least some of these items are typically returned to inventory 30. The various operations of a materials handling facility may be located in one building or facility, or alternatively may be spread or subdivided across two or more buildings or facilities.

Figure 2:
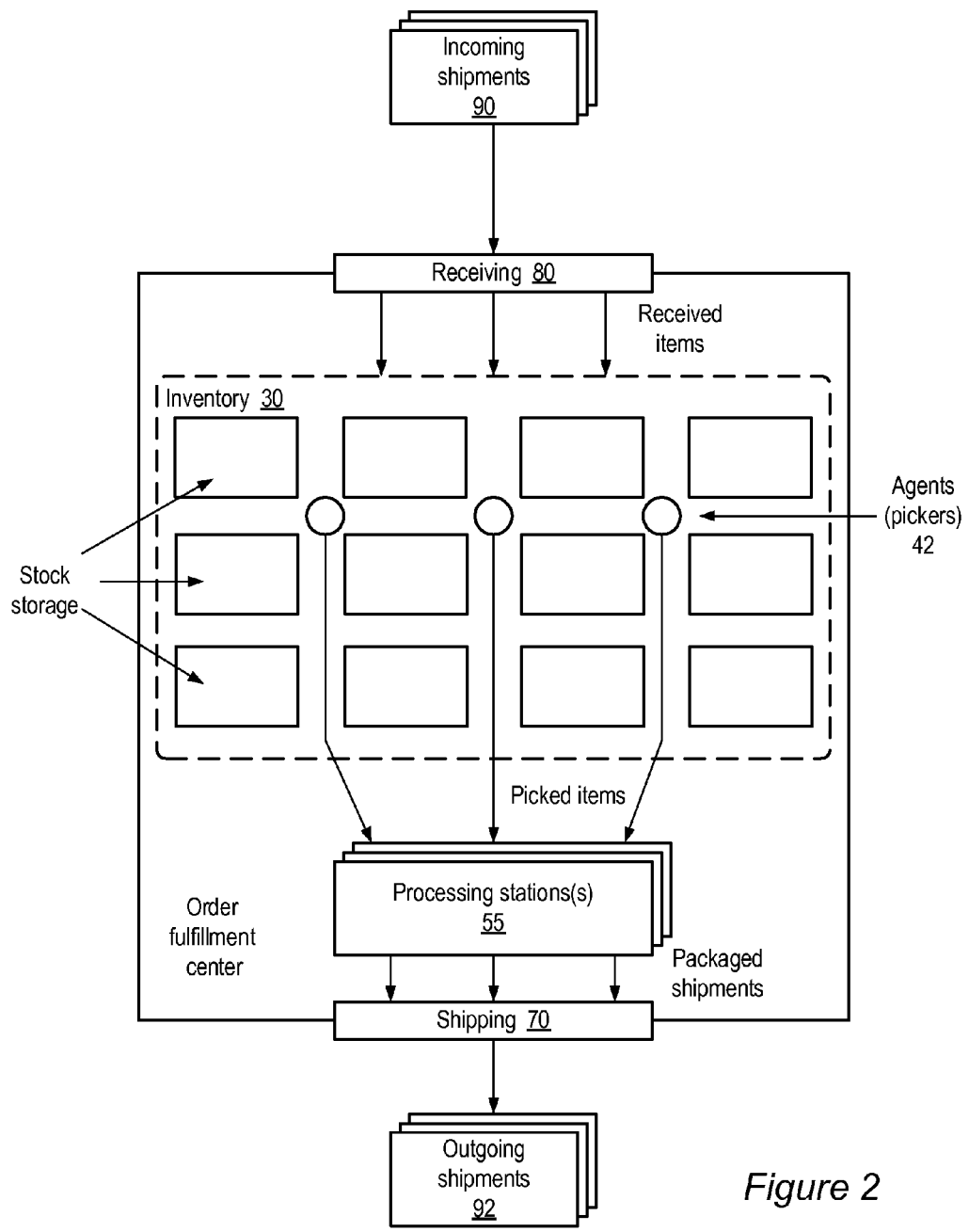
FIG. 2 illustrates a physical layout of an order fulfillment facility in which a duplicate shipment detection system may be implemented, according to one embodiment.

FIG. 2 illustrates an example of a physical layout of a materials handling facility, such as an order fulfillment facility, or center, in which embodiments of the duplicate shipment detection system may be implemented. At any time, one or more agents 42 of the distributor may each be picking items from inventory 30 to fulfill portions or all of one or more orders. This may result in a stream and/or batches of picked items for multiple incomplete or complete orders, which may then be delivered to various processing stations 55, for example sorting or packing stations, in the materials handling facility for processing prior to shipping 70. A stream may be a continuous or nearly continuous flow of picked items arriving at a station, while groups of items arriving periodically or aperiodically at a station may be referred to as batches. Portions of an order may be received from the pickers 42, or from other stations, at a station at different times, so processing at a station may have to wait for one or more items for some orders to be delivered to the station from picking and/or from another station before completion of processing of the orders.

The stream or batches of incoming picked items are processed at a processing station 55, for example sorted into their respective orders at a sorting station. Once the processing of items for an order is completed at a station, the items may be delivered to another station for further processing, for example to a sorting station to be sorted into orders or to a packing station to be packaged for shipping 70.

An order fulfillment center may also include one or more receiving 80 operations for receiving shipments 90 of stock from various vendors. The received stock may then be placed into stock storage. The receiving 80 operation may also receive and process returned, purchased, or rented items from customers. The various operations and stations of an order fulfillment center may be located in one building or facility, or alternatively may be spread or subdivided across two or more buildings or facilities.

As used herein, the term item identifier refers to a unique identifier associated with each particular type of item carried in inventory of a distribution system, such as inventory 30 of the exemplary materials handling facilities illustrated in FIGS. 1 and 2. The term unit may be used to refer to one (unit) of a type of item. A type of item may be referred to herein as simply an item. To clarify, a customer may order, for example, one unit, six units, etc. of item xyz, where xyz represents the item identifier. Typically, but not necessarily, each unit is tagged or otherwise marked with the item identifier. Cases, boxes, bundles, or other collections of units of items may similarly be marked or tagged with item identifiers. For example, units or collections of items in inventory may be marked or tagged with a bar code, Universal Product Code (UPC), Stock-Keeping Unit (SKU) code, serial number, and/or other designation (including proprietary designations) that may be used as item identifiers to facilitate materials handling facility operations, including, but not limited to, stowing, rebinning, picking, sorting, packing and shipping. These designations, or codes, may identify items by type, and/or may identify individual items within a type of item. A materials handling facility control system may include hand-held, mobile and/or fixed scanners or scanning devices that may be able to scan, receive, or otherwise detect the marks or tags (e.g., bar codes, radio frequency identification (RFID) tags, etc.) on individual items (units) or collections of items (e.g., cases) and communicate with a control station or stations of the control system to, for example, determine and record the item and/or item type of the items.

The term destination identifier may be used herein to refer to a unique customer/address combination to which one or more units of an ordered item are to be shipped. Each customer of the distributor may be identified by a customer identifier. For example, a unique customer identifier may be assigned to the customer (or alternatively specified by the customer) in the course of setting up an account with the distributor. The customer identifier may be a unique numeric or alphanumeric identifier, or alternatively some other unique identifier for the customer from information about the customer may be used, such as the customer's name, the customer's cell phone number, social security number, and so on, or a combination of two or more elements of customer information may be used as the customer identifier. Each customer may have one or more shipping addresses. For example, a customer may have a home shipping address and a business shipping address. A shipping address may be a street address, a P.O. box, or some other address to which shipments may be sent. Two customers may share a common shipping address. A combination of a customer identifier and a shipping address specifies a unique destination identifier. Thus, a customer may be associated with one or more destination identifiers.

Embodiments may provide a duplicate shipment detection system that detects duplicate shipment generation at a materials handling facility and/or at two or more materials handling facilities in a distribution system. In one embodiment, the duplicate shipment detection system may count the number of instances that a unique destination-identifier/item-identifier combination is fulfilled. An alarm may be triggered or raised if the number of instances exceeds a specified threshold. In another embodiment, instead of performing the count based on a combination of identifiers, the duplicate shipment detection system may perform the count based on a single identifier, such as an address identifier. Other embodiments could be based on combinations of other numbers of various identifiers.

In one embodiment, in a materials handling facility, one or more downstream processing stations may process packages each containing one or more units of one or more items, and each addressed to a particular destination identifier. An order from a customer may generate one or more shipments, and a shipment may include one or more packages. In one embodiment, the duplicate shipment detection system may capture destination-identifier/item-identifier information and possibly other information from packages at one or more downstream processing stations in the materials handling facility order fulfillment processing stream. Capturing the destination-identifier/item-identifier information at the level of packages downstream in the order fulfillment processing stream may help to make the duplicate shipment detection system independent of the orders and shipments themselves. In one embodiment, at a downstream processing station, each time a package passes the station successfully, a message that contains at least the following information may be published in a message:

Destination identifier.

One or more unique item identifiers for items in the package.

Other information that may help to identify the package (e.g., a shipment identifier, a package identifier, an order identifier, etc.) may also be included in the message. The message may be sent to or collected by an aggregator component of the duplicate shipment detection system. The aggregator component may insert the collected information into a data store (e.g., a file, a database or a table of a database, a memory cache, etc.) for collected duplicate shipment detection information, referred to herein as a duplicate shipment detection database.

An analysis engine component of the duplicate shipment detection system may be configured to periodically or aperiodically perform an analysis of the collected data stored in the duplicate shipment detection database in accordance with an analysis interval, for example 30 minutes or one hour. The analysis may be performed on a most recent window of data, for example two weeks or one month of data. In one embodiment, for every analysis interval of time, all destination-identifier/item-identifier combinations collected in the analysis interval may be examined to determine the number of instances each destination-identifier/item-identifier combination occurs in the aggregated data (the window, e.g. two weeks or one month). The number of destination-identifier/item-identifier combinations that have an occurrence count greater than a specified number may be counted, and if the sum is greater than a specified threshold, an alarm may be raised. In one embodiment, the number to which the occurrence count is compared is one. In other embodiments, the number to which the occurrence count is compared may be specified as a number greater than one. In one embodiment, the number to which the occurrence count is compared may be adjustable to tune the counting of destination-identifier/item-identifier combinations according to normal operations of the materials handling facility and/or distribution system. For example, it may be necessary or desired to raise the number from one to two (or some higher number) if it is determined that two occurrences of destination-identifier/item-identifier combinations are normal and thus should not be counted, as counting two (or some higher number) occurrences of destination-identifier/item-identifier combinations may unnecessarily raise an alarm. In one embodiment, the specified threshold may be adjustable. In one embodiment, instead of performing the count based on a combination of destination-identifier/item-identifier, the duplicate shipment detection system may perform the count based on a single identifier, such as an address identifier. Other embodiments could be based on combinations of other numbers of various identifiers.

Embodiments may provide a distribution system the ability to monitor how many of the same items are being fulfilled per destination identifier across one or more materials handling facilities. Embodiments may be used to detect an excessive number of duplicate shipments (e.g., above a specified or calculated threshold for a specified interval), and may also allow the distributor to detect systemic problems such as fraud or pricing errors that, for example, may result in customers ordering or being shipped excessively large quantities of the mispriced item(s).

In one embodiment, the duplicate shipment detection system may operate independently of other materials handling facility processes, such as upstream order fulfillment processes. The independence may be a logical independence, as the duplicate shipment detection system may share at least some physical aspects or components with the materials handling facility processes. The independence of the duplicate shipment detection system may be achieved by capturing destination-identifier/item-identifier information downstream in an order fulfillment processing stream such as the stream illustrated in FIG. 1, for example at a point in the stream when the items are packaged and the packages are being labeled or have already been labeled.

While embodiments are generally described herein in which destination-identifier/item-identifier and possibly other information are captured from packages at processing station(s) downstream in the order fulfillment processing stream, in some embodiments, information to be used in duplicate shipment detection may be captured at other locations or points in the order fulfillment processing stream instead of or in addition to from packages at downstream processing station(s), and/or from other sources than packages. Data describing item collections (shipments, packages, orders) may be collected at different points in the order fulfillment process in a similar manner as described for packages at downstream processing stations to determine if duplication of shipments, packages, and/or orders is occurring. Examples of other data collection points for embodiments of the duplicate shipment detection system may be shipment messages that the distributor may send to internal and/or external shipment facilities, and order confirmation within the order pipeline.

In some embodiments, duplicate shipment detection data may be collected at one or more other points and analyzed by the duplicate shipment detection system in addition to or instead of data collected from packages at one or more downstream processing stations, which may allow at least some duplicate shipments caused by upstream errors to be detected earlier in the order processing stream. Errors that generate duplicate shipments may occur after an earlier data collection point, so data collection from packages at one or more downstream processing stations may be analyzed to detect duplicate shipments that occur later in the processing stream and duplicate shipments that are missed for some reason by an analysis of the collected data from an earlier data collection point.

Another example of an application for an upstream data collection point for duplicate shipment detection data is in cases where the distribution system communicates at least some shipment/order information to an external fulfiller. In other words, at least some ordered items may not be picked, packed and shipped within the distribution system; instead, order or shipment information may be communicated to an external entity (fulfiller) that stocks the items in inventory; the external fulfiller may then generate the shipments and packages containing the ordered items. In such environments, an upstream data collection point for duplicate shipment detection data may be used by the distributor to detect duplicate shipments before the shipment/order information is transmitted to the external fulfiller. For example, the data may be collected from messages generated to be sent to the external fulfiller specifying the orders or shipments the external fulfiller is to fulfill.

Figure 3:
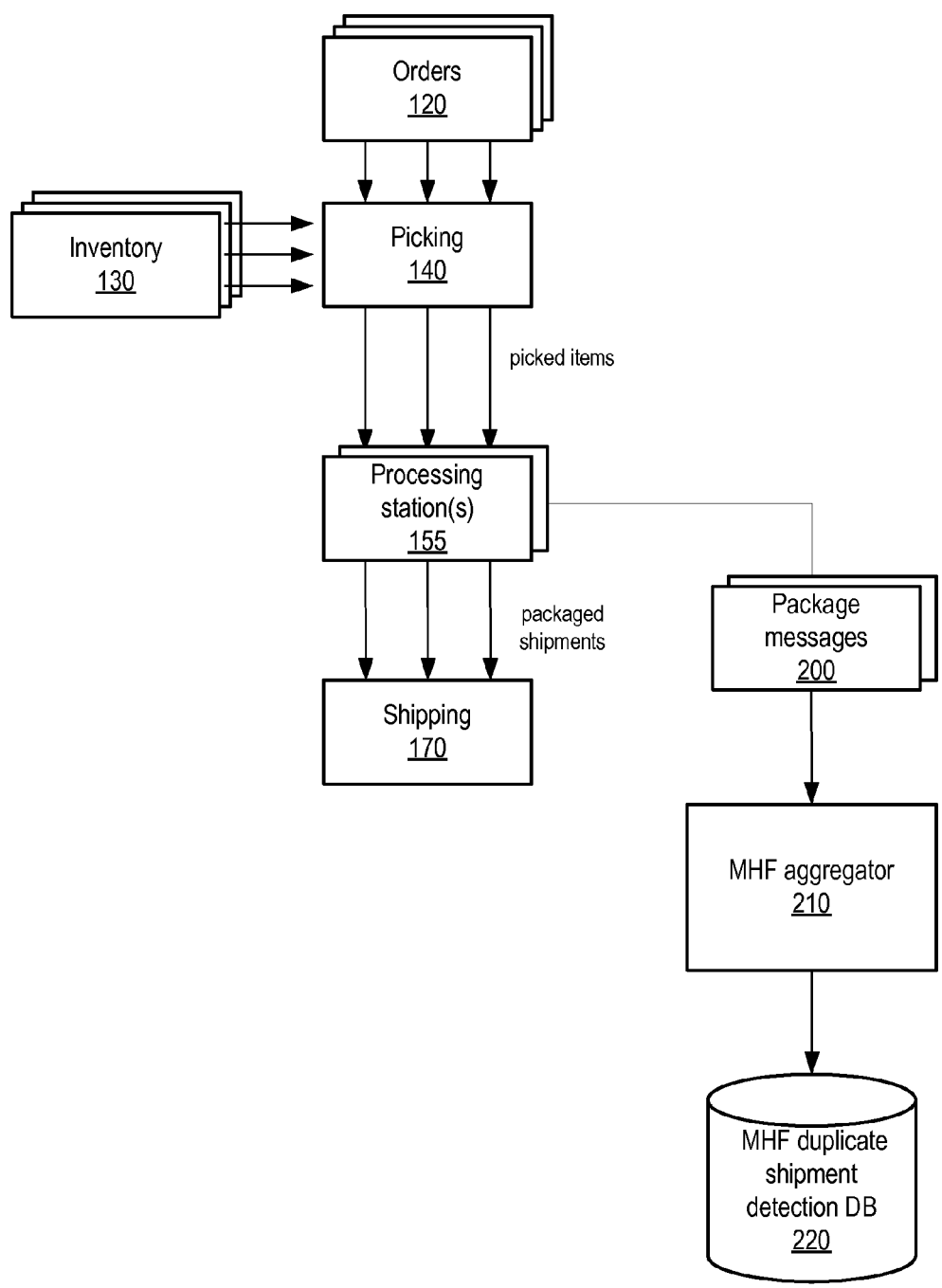
FIG. 3 illustrates the capturing of information to be used in duplicate shipment detection in a materials handling facility order fulfillment processing stream according to one embodiment.

FIG. 3 is a logical representation of an order fulfillment processing stream in which information may be captured to be used in duplicate shipment detection in the processing stream according to one embodiment. Customers may submit orders 120 to the product distributor, where each order specifies one or more items from inventory 130 to be shipped to the customer that submitted the order. To fulfill the customer orders 120, the one or more items specified in each order may be retrieved, or picked, from inventory 130 in the materials handling facility, as indicated at 140. Picked items may be delivered or conveyed, if necessary, to one or more processing stations 155 in the materials handling facility for (optional) sorting into their respective orders, packing, and finally shipping 170 to the customers. A picked, packed and shipped order does not necessarily include all of the items ordered by the customer; an outgoing shipment to a customer may include only a subset of the ordered items available to ship at one time from one inventory-storing location. Thus, an order may generate one or more shipments. A shipment may include one or more packages, and a package may include one or more units of one or more items.

Information which may include destination identifier and item information may be captured at one or more stages within the processing stream. In some embodiments, the information may be captured at one or more processing stations 155 downstream in the order fulfillment processing stream. In one embodiment, this information may be captured for each package that passes through the station(s) 155. The information may be captured automatically at an automated processing station 155 and/or manually at a processing station 155. The information may be captured for each package, for example, by scanning a tag or label on the package, by reading a passive or active radio frequency identification (RFID) tag or tags on or in the package, or by capturing information entered for the package at the processing station 155. As noted above, the destination identifier may be a unique customer/address combination to which the package is to be shipped. The item information may include item identifier(s) identifying the item(s) in the package, and may include counts of units of the item(s) in the package. Other information, such as a package identifier that uniquely identifies the package the information was captured for, a shipment identifier that identifies a shipment the package belongs to, and/or an order identifier that identifies an order related to the package, may also be captured.

The captured information may be sent as package messages 200 to a materials handling facility (MHF) aggregator 210. In one embodiment, captured information for each package that passes through a station 155 may be sent as a separate package message 200. Alternatively, information captured from two or more packages may be sent in one package message 200. MHF aggregator 210 may be a software program instantiated on one or more computer systems. The package messages 200 may be sent to the MHF aggregator 210 via a wired or wireless connection. MHF aggregator 210 may insert the information received in package messages 200 from one or more stations 155 into a MHF duplicate shipment detection database 220. Database 220 may be a standalone database or alternatively one or more tables in another MHF database. One skilled in the art will recognize that the information may be organized in database 220 according to any of a variety of formats.

Figure 4:
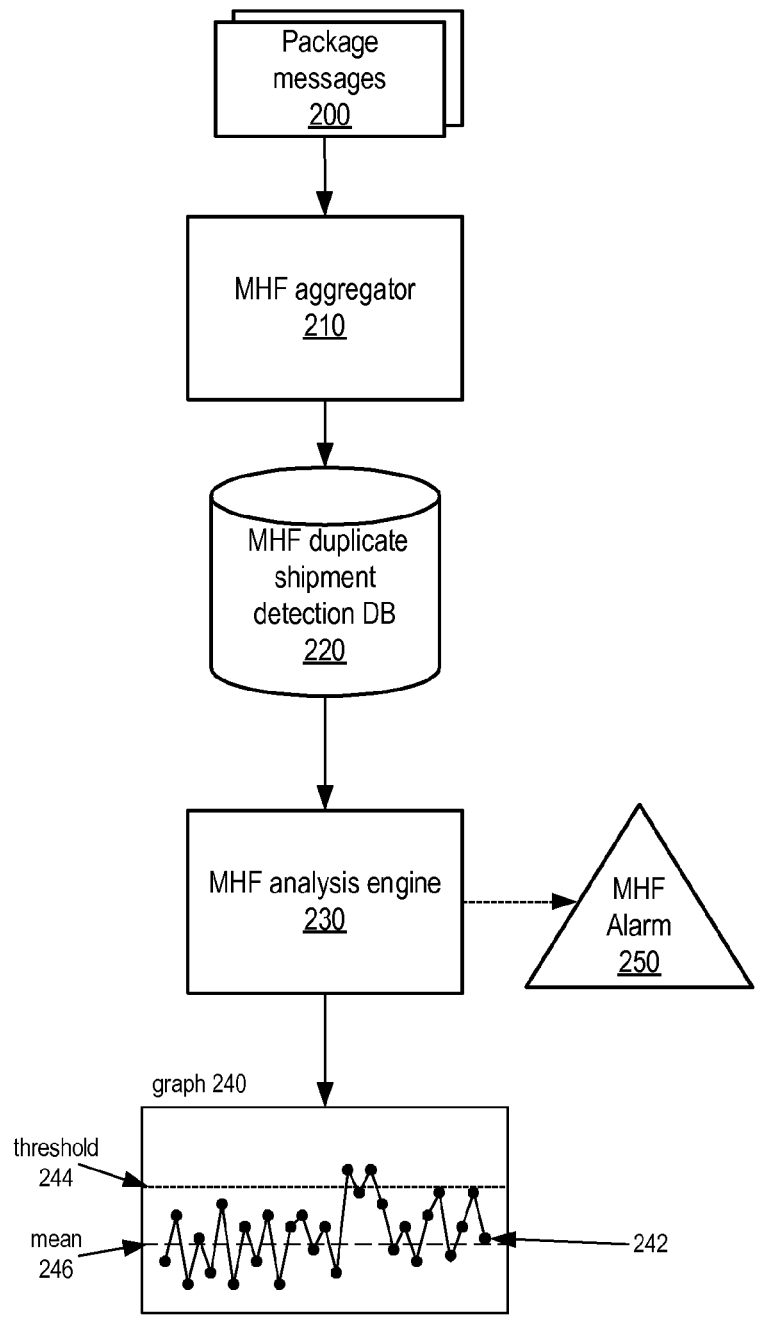
FIG. 4 illustrates the analysis of captured duplicate shipment detection information in a materials handling facility according to one embodiment.

FIG. 4 illustrates the analysis of captured duplicate shipment detection information in a materials handling facility according to one embodiment. Captured package information may be sent as package messages 200 to MHF aggregator 210. MHF aggregator 210 may insert the information received in package messages 200 from one or more stations 155 into MHF duplicate shipment detection database 220. This information may be continuously captured and inserted into the database 220 in the materials handling facility.

Periodically or aperiodically, MHF analysis engine 230 may perform an analysis of data stored in duplicate shipment detection database 220. An analysis interval may be based on time (e.g., five minutes, 30 minutes, one hour, etc.) or alternatively may be based on package count (e.g., every 10,000 packages). In performing an analysis, MHF analysis engine 230 may consider data captured and stored in database 220 within a window (which may include one or more analysis intervals). The window may be based on time (e.g., two weeks (14 days) four weeks (28 days), or 30 days may be used as a time window) or alternatively on package count (e.g., 1,000,000 packages may be used as the window). In one embodiment, the window may be one analysis interval. For simplicity, the following discussion will consider an exemplary time window (e.g., 30 days) and an exemplary analysis interval (e.g., 30 minutes) as being used in the analysis process. The window may be a "sliding window"; each window that is analyzed by MHF analysis engine 230 includes the information captured in the most recent analysis interval (e.g., in the 30 minutes since the previous analysis was performed), while the oldest information may be dropped.

In one embodiment, in the analysis, MHF analysis engine 230 may perform a statistical analysis of the data collected within the window (e.g., 30 days), including the most recent data collected since the last analysis was performed (in the analysis interval, e.g., the last 30 minutes of collected data). The MHF analysis engine 230 may, for each destination-identifier/item-identifier combination in the data collected since the last analysis (during the analysis interval), count the number of occurrences of that particular combination in the data for the window (including the data from the most recent analysis interval). Thus, in one embodiment, the MHF analysis engine 230 is looking for multiple shipments of particular items to particular destination identifiers, which may alternatively be viewed as looking for multiple packages that include the same destination-identifier/item-identifier combination. This is performed for each destination-identifier/item-identifier combination in the data collected since the last analysis to generate an occurrence count for the destination-identifier/item-identifier combination. In one embodiment, if a package contains two or more units of a particular item, those units are counted as one occurrence of the item, not as multiple occurrences. In one embodiment, if two or more packages for which data is collected in the most recent analysis interval each include a particular destination-identifier/item-identifier combination, they may be counted as two occurrences of the destination-identifier/item-identifier combination. Alternatively, the MHF analysis engine 230 may determine from the collected data that the two or more packages represent the splitting of multiple units of the item ordered by the customer into two or more packages and thus not count them as multiple occurrences of the destination-identifier/item-identifier combination. In one embodiment, instead of counting the number of occurrences of destination-identifier/item-identifier combinations, the MHF analysis engine 230 may perform the count based on a single identifier, such as an address identifier. Other embodiments could be based on combinations of other numbers of various identifiers.

In one embodiment, for each destination-identifier/item-identifier combination in the data collected since the last analysis that has an occurrence count greater than a specified number, the MHF analysis engine 230 may increment a duplicate shipment count (which may be initialized to zero at the beginning of the analysis). In one embodiment, the number to which the occurrence count is compared is one. In other embodiments, the number to which the occurrence count is compared may be specified as a number greater than one. In one embodiment, the number to which the occurrence count is compared may be adjustable. After processing all of the destination-identifier/item-identifier combinations in the data collected since the last analysis, the duplicate shipment count may be compared to a duplicate shipment threshold. If the duplicate shipment count exceeds the threshold, MHF analysis engine 230 may generate an MHF alarm 250. Alternatively, MHF analysis engine 230 may only raise an alarm 250 if the duplicate shipment count exceeds the threshold for a specified number of analysis intervals. Alternatively, there may be two or more levels of thresholds. For example, there may be a first threshold for which MHF analysis engine 230 may raise an alarm 250 if the duplicate shipment count exceeds the lower threshold for a specified number of analysis intervals, and a second threshold for which MHF analysis engine 230 may raise an alarm 250 immediately upon detecting that the duplicate shipment count has exceeded the higher threshold.

In regards to thresholds and alarm conditions, a basic implementation may be to have one threshold, where the one alarm condition was that a single violation of that threshold triggered an alarm. Another implementation may be to have one threshold, but to require the violation to repeat for a specified number of intervals before raising an alarm. Another implementation may be to have one threshold, but different alarms to indicate different conditions (e.g. "condition yellow" for a first violation of the threshold, "condition red" for multiple violations of the threshold).

Another implementation may be to have two levels of threshold; above a first, multi-interval threshold, an alarm is raised if the count exceeds the threshold for a specified number of intervals; above a second, single-interval threshold, an alarm is raised if the count exceeds the threshold once. Other combinations or numbers of thresholds and alarm conditions may be used; the description of thresholds and alarm conditions is not limited to one or two levels of thresholds, or to the particular conditions described.

In one embodiment, the threshold(s) may be determined by or set according to a statistical analysis of the collected duplicate shipment detection information over a period (e.g., a window, or a period longer or shorter than a window). For example, some multiple or multiple of standard deviations from a statistically determined mean may be used as thresholds. Alternatively, a percentage or percentages of the total packages in the analysis interval that include duplicate shipments of items may be used for threshold(s). For example, thresholds may be set to raise an alarm if over 5% of the packages in an analysis interval include duplicate shipments, or if the number of packages that include duplicate shipments stays at over 2% of the total packages for, for example, four analysis intervals. One of ordinary skill in the art will recognize that other methods for determining thresholds may be used. The thresholds, however determined, may be tunable, for example to adjust a threshold upward if too many false positives are being detected or downward if too many false negatives are occurring.

In one embodiment, MHF analysis engine 230 may graphically display results of an analysis. For example, a graph may be displayed on a display screen and/or may be plotted to paper. Graph 240 represents an exemplary visual presentation of the analysis performed by MHF analysis engine 230 over some number of analysis intervals, and is not intended to be limiting. Graph 240 may plot the duplicate shipment count determined over some time interval. The rightmost point 242 on the graph may represent the duplicate shipment count for the most recent analysis interval. The other points on the graph may represent duplicate shipment counts for previous analysis intervals. Mean 246 represents a calculated mean for the duplicate shipment counts collected over a period. The mean may, for example, be calculated for the data collected for a window period (e.g., two weeks or a month), for a period longer than the window (e.g., for a year, for twelve windows, etc.), or for a period shorter than the window.

Threshold 244 represents a threshold for the duplicate shipment count above which an alarm 250 may be raised according to one or more conditions, as was previously described. There may be one or more levels of threshold 244. Threshold(s) 244 may be specified by a human operator, or alternatively may be automatically calculated by MHF analysis engine 230 using a statistical analysis method according to a specified formula. For example, a threshold 244 may be based on some multiple of a calculated standard deviation, e.g. two standard deviations from the mean 246, 2.5 standard deviations from the mean 246, and so on. In one embodiment, the threshold(s) 244 may be automatically and/or manually tunable so that the threshold(s) 244 may be adjusted if necessary or desired, for example to avoid a detected high occurrence of false positives that have been raising undesirable "false" alarms.

As described above, MHF analysis engine 230 may raise an alarm 250 under certain detected conditions, for example if the duplicate shipment count calculated for the most recent analysis interval exceeds a threshold 244, or alternatively if the duplicate shipment count stays above a threshold 244 for a specified number of analysis intervals. Alarm 250 may be raised in one or more of any of a variety of ways, and may generate any of one or more different alarm signals or messages or combinations thereof. For example, an alarm message may be displayed on a console or consoles at one or more stations 155 or elsewhere in the materials handling facility, and/or printed on one or more printers. If the duplicate shipment count is being plotted to a graph 240, the alarm condition may be visually represented on the display, for example by an alarm indicator turning red or some other color on the display, and/or by an audible alarm tone being sounded. Other visual and/or audio alarm signals may be generated, for example a light may come on at one or more stations 155 or other locations in the materials handling facility. In one embodiment, one or more notifications, for example, e-mail, text messages, and/or phone calls, may be generated to alert particular personnel and/or stations 155 of the alarm 250. In one embodiment, the alarm 250 may be automatically entered into an alarm log or event log for the materials handling facility. One of ordinary skill in the art will recognize that other methods for indicating an alarm 250 to operators and/or to automated equipment, software, or computer systems are possible.

Action taken upon an alarm 250 being raised by the duplicate shipment detection system may depend upon the implementation of the system in the particular materials handling facility. In one embodiment, an alarm 350 may notify one or more appropriate personnel of a potential problem with overshipments of items to customers in the materials handling facility, and the personnel may take the appropriate steps to identify and rectify the problem. In one embodiment, an alarm 250 may be used to proactively stop one or more packages that include duplicate destination-identifier/item-identifier combinations from being shipped. In one embodiment, the information collected from packages at one or more stations 155 as illustrated in FIG. 3 may include an order identifier, shipment identifier, and/or package identifier. When an alarm is raised by the duplicate shipment detection system, this information may, for example, be used to identify particular packages shipments, and/or orders to shipping 170 that may include duplicated destination-identifier/item-identifier combinations. Shipping 170 may then hold these packages, orders, and/or shipments so that the duplication may be corrected. Thus, embodiments of the duplicate shipment detection system may be used to prevent overshipments of items to customers, or duplicate units of items from being shipped inadvertently to customers. One of ordinary skill in the art will recognize that other responses to an alarm 250 by operators and/or by automated equipment, software, or computer systems are possible.

An alarm 250 may indicate a significant, possibly systemic, problem, or "disaster", in the materials handling facility upstream of the station 155 at which the information was collected as indicated in FIG. 3. An alarm 250 may indicate that some problem or condition in the materials handling process is causing duplicate units of items in significant quantities to be picked and packed for shipping to destination identifiers to raise an alarm 250. The problem may be human error, computer/software/other equipment error, or some other error or combination of errors. Such a systemic problem, if undetected and uncorrected, may result in a significant financial loss for the distributor. Upon receiving the alarm 250, the collected information may then be used to help track down and correct the problem that is causing duplicate shipments. In one embodiment, as an extreme measure, the materials handling facility processing of orders may even be halted temporarily until the problem is identified and corrected.

Figure 5:
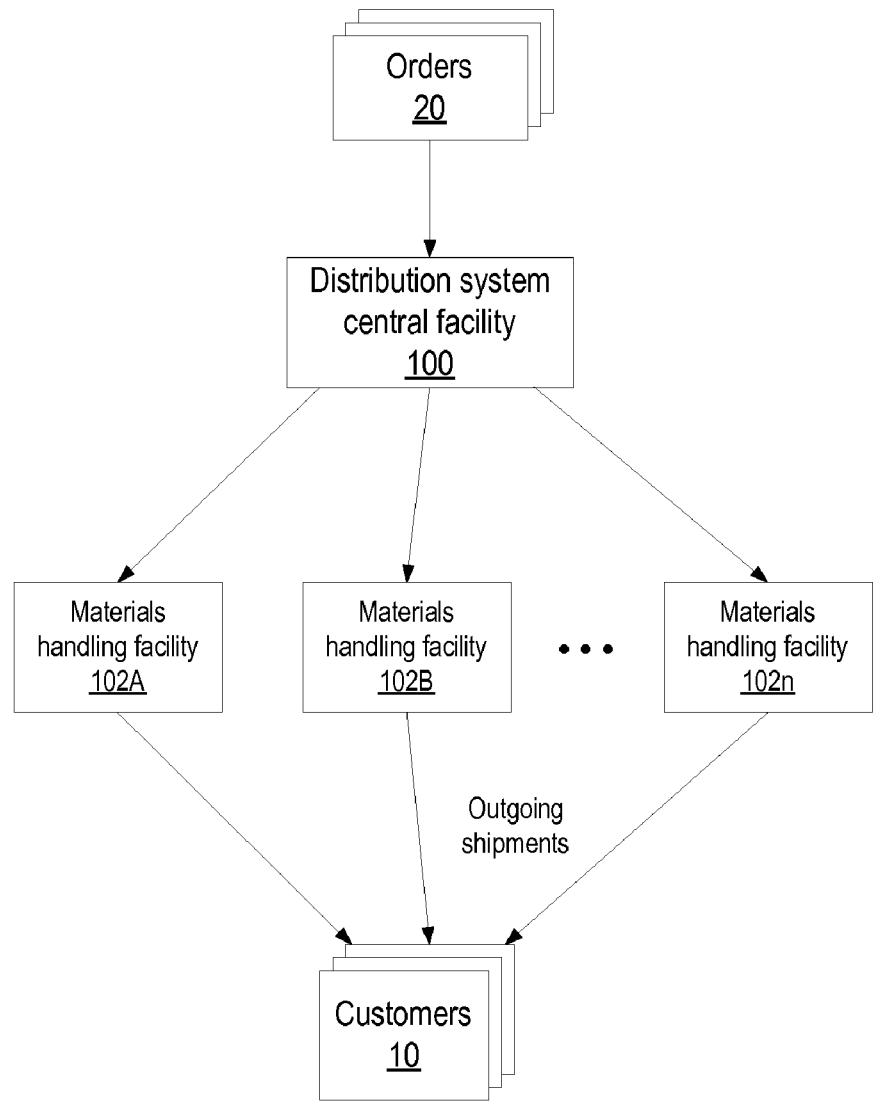
FIG. 5 illustrates a distribution system comprising a plurality of materials handling facilities, according to one embodiment.

FIGS. 3 and 4 illustrate the collection and processing of duplicate shipment detection information by a duplicate shipment detection system at one materials handling facility. A distribution system may include a plurality of materials handling facilities. FIG. 5 illustrates a distribution system comprising a plurality of materials handling facilities in which embodiments of the duplicate shipment detection system may be implemented. In this distribution system, a product distributor maintains an inventory of various items at two or more materials handling facilities 102. Orders 20 for items may be received from customers 10 of the product distributor at a distribution central facility 100, where each order 20 specifies one or more items from inventory 30 to be shipped to the customer 10 that submitted the order 20. The orders may be distributed among the materials handling facilities 102. The ordered items are picked from the inventory in the materials handling facilities 102 and shipped as outbound shipments to the customers 10. An order may be subdivided to two or more materials handling facilities 102.

A distributor may implement an embodiment of the duplicate shipment detection system at one or more of the materials handling facilities to detect duplicate shipments at the materials handling facilities. In one embodiment, these implementations may operate independently. Alternatively, or in addition, a distributor may implement an embodiment of the duplicate shipment detection system at the distribution system level that may be used to detect duplicate shipments that may occur across two or more materials handling facilities. Thus, a distributor with multiple materials handling facilities (MHFs) may implement embodiments of the duplicate shipment detection system at one or more of the MHFs, and/or may implement a distribution system (DS) level duplicate shipment detection system that may be used to detect duplicate shipments that may occur across two or more of the MHFs. In one embodiment, the distribution system level duplicate shipment detection system may also be used to detect duplicate shipments at particular materials handling facilities.

Figure 6:
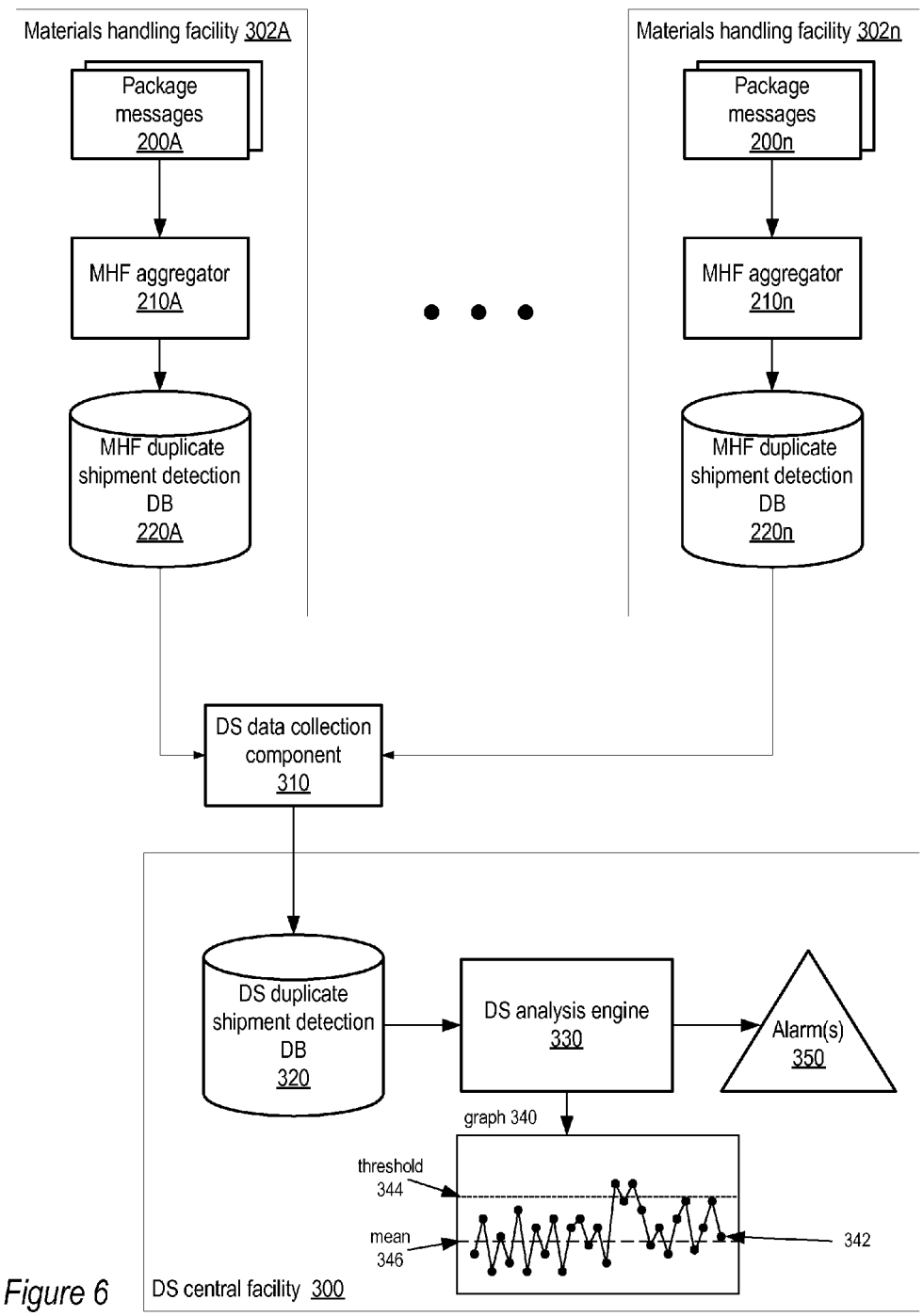
FIG. 6 illustrates the collection and processing of duplicate shipment detection data from two or more materials handling facilities at the level of the distribution system to detect duplicate shipments that may occur across two or more materials handling facilities according to one embodiment.

FIG. 6 illustrates the collection and processing of duplicate shipment detection data from two or more materials handling facilities at the level of the distribution system to detect duplicate shipments that may occur across two or more materials handling facilities according to one embodiment. In one embodiment, at each of two or more materials handling facilities 302, captured package information may be sent as package messages 200 to a MHF aggregator 210 at the materials handling facility. MHF aggregator 210 may insert the information received in package messages 200 from one or more stations 155 into MHF duplicate shipment detection database 220. This information may be continuously captured and inserted into the database 220 in the materials handling facility.

In one embodiment, periodically or aperiodically, a distribution system data collection component 310 may be used to collect data from the MHF duplicate shipment detection databases 220 associated with the materials handling facilities 302. The collected data may be inserted into a distribution system duplicate shipment detection database 320 at a distribution system central facility 300 (central facility 300 may be, but is not necessarily, located at one of materials handling facilities 302). In one embodiment, a tag or other information identifying the particular materials handling facility 302 that the data was collected from may be included with associated data in the distribution system duplicate shipment detection database 320. The collection of data from the materials handling facilities 302 may be performed according to the analysis interval used by the materials handling facilities, or according to some other interval, for example once a day, once an hour, once every six hours, once a shift, or once every N MHF-level analysis intervals. The individual materials handling facilities 302 may all use the same analysis interval, or alternatively may use different analysis intervals.

Data collection component 310 may be implemented in any of a variety of ways. In one embodiment, each materials handling facility 302 may include a component that periodically or aperiodically uploads the most recently collected duplicate shipment detection data to distribution system duplicate shipment detection database 320. In one embodiment, central facility 300 may include software, hardware, or a combination thereof, such as a daemon or other software program, that periodically or aperiodically collects data from each MHF duplicate shipment detection database 220 and inserts the data into distribution system duplicate shipment detection database 320. Alternatively, the data collected at processing stations 155 may be cached to memory, and transferred from there to memory at the distribution system level, where the data may then be inserted into the distribution system duplicate shipment detection database 320. One of ordinary skill in the art will recognize that other methods of transferring data from two or more materials handling facilities 302 to a central database 320 are possible.

As an alternative to collecting data from MHF duplicate shipment detection databases 220, in one embodiment, data collected at processing stations 155 in each materials handling facility 302 may be transmitted directly to a data collection component 310 that then inserts the data into database 320 as it is collected in package messages such as package messages 200 illustrated in FIG. 3.

Periodically or aperiodically, a distribution system analysis engine 330 may perform an analysis of data stored in distribution system duplicate shipment detection database 320. An analysis interval may be based on time (e.g., five minutes, 30 minutes, one hour, etc.) or alternatively may be based on package count (e.g., every 10,000 packages). The distribution system-level analysis interval, which may be referred to herein as the DS analysis interval to distinguish it from the MHF-level analysis interval, may be the same or may be different than the MHF analysis interval(s) that are being used at the materials handling facilities 302. In performing an analysis, DS analysis engine 330 may consider data captured and stored in database 320 within a window (which includes multiple DS analysis intervals). The distribution system-level window, which may be referred to herein as the DS window to distinguish it from the MHF-level windows, may be the same or may be different than the window(s) that are being used at the materials handling facilities 302. The DS window may be based on time (e.g., two weeks (14 days) four weeks (28 days), or 30 days may be used as a time window) or alternatively on package count (e.g., 1,000,000 packages may be used as the window). For simplicity, the following discussion will consider an exemplary DS time window (e.g., 30 days) and an exemplary DS analysis interval (e.g., 30 minutes) as being used in the DS-level analysis process. The DS window may be a "sliding window"; in other words, each DS window that is analyzed by DS analysis engine 330 includes the information captured in the most recent DS analysis interval (e.g., in the 30 minutes since the previous analysis was performed), while the data from the oldest DS analysis interval may be dropped.

In one embodiment, in the DS-level analysis, DS analysis engine 330 may perform a statistical analysis of the data collected within the DS window (e.g., 30 days), including the most recent data collected since the last DS analysis was performed (in the DS analysis interval, e.g., the last 30 minutes of collected data). The DS analysis engine 330 may, for each destination-identifier/item-identifier combination in the data collected since the last DS analysis (during the analysis interval), count the number of occurrences of that particular combination in the data for the DS window (including the data from the most recent DS analysis interval). Thus, in one embodiment, the DS analysis engine 330 may look for multiple shipments of particular items to particular destination identifiers across a set of materials handling facilities 302 from which data has been collected, which may alternatively be viewed as looking for multiple packages that include the same destination-identifier/item-identifier combination across the materials handling facilities 302. This is performed for each destination-identifier/item-identifier combination in the package data collected since the last DS analysis to generate an occurrence count for the destination-identifier/item-identifier combinations. In one embodiment, if a package contains two or more units of a particular item, those units may be counted as one occurrence of the item, and not as multiple occurrences. In one embodiment, if two or more packages for which data is collected in the most recent DS analysis interval each include a particular destination-identifier/item-identifier combination, the packages may be counted as two occurrences of the destination-identifier/item-identifier combination. Alternatively, the DS analysis engine 330 may determine from the collected data that the two or more packages represent the splitting of multiple units of the item ordered by the customer into two or more packages and thus not count them as multiple occurrences of the destination-identifier/item-identifier combination. In one embodiment, instead of counting the number of occurrences of destination-identifier/item-identifier combinations, the DS analysis engine 330 may perform the count based on a single identifier, such as an address identifier. Other embodiments could be based on combinations of other numbers of various identifiers.

In one embodiment, for each destination-identifier/item-identifier combination in the data collected since the last analysis that has an occurrence count greater than a specified number, the DS analysis engine 330 may increment a duplicate shipment count (which may be initialized to zero at the beginning of the analysis). In one embodiment, the number to which the occurrence count is compared is one. In other embodiments, the number to which the occurrence count is compared may be specified as a number greater than one. In one embodiment, the number to which the occurrence count is compared may be adjustable. After processing all of the destination-identifier/item-identifier combinations in the data collected since the last analysis, the duplicate shipment count may be compared to a duplicate shipment threshold. If the duplicate shipment count exceeds the threshold, DS analysis engine 330 may generate an alarm 350. Alternatively, DS analysis engine 330 may only raise an alarm 350 if the duplicate shipment count exceeds the threshold for a specified number of analysis intervals. In one embodiment, there may be multiple thresholds. For example, there may be a lower threshold for which DS analysis engine 330 may raise an alarm 350 if the duplicate shipment count exceeds the lower threshold for a specified number of analysis intervals, and a higher threshold for which DS analysis engine 330 may raise an alarm 350 immediately upon detecting that the duplicate shipment count has exceeded the higher threshold.

In one embodiment, DS analysis engine 330 may graphically display results of an analysis. For example, a graph may be displayed on a display screen and/or may be plotted to paper. Graph 340 represents an exemplary visual presentation of the analysis performed by DS analysis engine 330 over some number of analysis intervals, and is not intended to be limiting. Graph 340 may plot the duplicate shipment count determined over some time interval. The rightmost point 342 on the graph may represent the duplicate shipment count for the most recent analysis interval. The other points on the graph may represent duplicate shipment counts for previous analysis intervals. Mean 346 represents a calculated mean for the duplicate shipment counts collected over a period. The mean may, for example, be calculated for the data collected for a window period (e.g., two weeks or a month), for a period longer than the window (e.g., for a year, for twelve windows, etc.), or for a period shorter than the window.

Threshold 344 represents a threshold for the duplicate shipment count above which an alarm 350 may be raised, as was previously described. There may be one or more levels of threshold 344. Threshold(s) 344 may be specified by a human operator, or alternatively may be automatically calculated by DS analysis engine 330 using a statistical analysis method according to a specified formula. For example, a threshold 344 may be based on some multiple of a calculated standard deviation, e.g. two standard deviations from the mean 346, 2.5 standard deviations from the mean 346, and so on. In one embodiment, the threshold(s) 344 may be automatically and/or manually tunable so that the threshold(s) 344 may be adjusted if necessary or desired, for example to avoid a detected high occurrence of false positives that have been raising undesirable "false" alarms. The DS window and the DS analysis interval may also be tunable.

As described above, DS analysis engine 330 may raise an alarm 350 under certain detected conditions, for example if the duplicate shipment count calculated for the most recent analysis interval exceeds a threshold 344, or alternatively if the duplicate shipment count stays above a threshold 344 for a specified number of DS analysis intervals. Alarm 350 may be raised in one or more of any of a variety of ways, and may generate any of one or more different alarm signals or messages or combinations thereof. For example, an alarm message may be displayed on a console or consoles at one or more stations 155 or elsewhere in one or more of the materials handling facilities 302 and/or in the DS central facility 300, and/or printed on one or more printers. If the duplicate shipment count is being plotted to a graph 340, the alarm condition may be visually represented on the graph, for example by an alarm indicator turning red or some other color on the display, and/or by an audible alarm tone being sounded. Other visual and/or audio alarm signals may be generated, for example a light may come on at one or more stations 155 or other locations in one or more of the materials handling facilities. Email, text messages, and/or phone calls may be generated to alert particular personnel of the DS central facility 300 and/or materials handling facilities 302 of the alarm 350. In one embodiment, the alarm 350 may be automatically entered into an alarm log or event log for the distribution system. One of ordinary skill in the art will recognize that other methods for indicating an alarm 350 to personnel, operators and/or to automated equipment, software, or computer systems are possible.

Action taken upon an alarm 350 being raised by the duplicate shipment detection system may depend upon the implementation in the distribution system. In one embodiment, an alarm 350 may notify one or more appropriate personnel of a potential problem with overshipments of items to customers in the distribution system, and the personnel may take the appropriate steps to identify and rectify the problem. In one embodiment, an alarm 350 may be used to proactively stop one or more packages that include duplicate destination-identifier/item-identifier combinations from being shipped at one or more of materials handling facilities 302. In one embodiment, the information collected from packages at one or more stations 155 of materials handling facilities 302 as illustrated in FIG. 3 may include an order identifier, shipment identifier, and/or package identifier, and possibly other information. This information may be used to identify particular packages shipments, and/or orders that may include duplicated destination-identifier/item-identifier combinations. Shipping 170 at one or more materials handling facilities 302 may then be notified to hold these packages, orders, and/or shipments so that the duplication may be corrected. Thus, embodiments of the DS-level duplicate shipment detection system may be used to prevent overshipments of items to customers, or duplicate units of items from being shipped inadvertently to customers, across one or more materials handling facilities 302. One of ordinary skill in the art will recognize that other responses to an alarm 350 by personnel, operators and/or by automated equipment, software, or computer systems are possible.

An alarm 350 at the distribution system level may indicate a significant, possibly systemic, problem, or "disaster", in the materials handling facilities 302 of the distribution system upstream of the stations 155 at which the information was collected as indicated in FIG. 3. An alarm 350 may indicate that some problem or condition in the materials handling process is causing duplicate units of items in significant quantities to be picked and packed for shipping to destination identifiers to raise an alarm 350. The problem may be human error, computer/software/other equipment error, or some other error or combination of errors. Such a distribution system-level problem, if undetected and uncorrected, may result in a significant financial loss for the distributor. Upon receiving the alarm 350, the collected information may then be used to help track down and correct the problem that is causing duplicate shipments. In one embodiment, as an extreme measure, the processing of orders by one or more materials handling facilities 302 may even be halted temporarily until the problem is identified and corrected.

In one embodiment, data may be collected into MHF duplicate shipment detection databases 220, and distribution system-wide data may be collected from the materials handling facilities 302 and inserted into DS duplicate shipment detection database 320. Analysis of the data may then be performed at both the materials handling facility level and at the distribution system level. In an alternative embodiment, there may be no MHF duplicate shipment detection databases 220, and no MHF analysis engine 230 at each materials handling facility 302. In this embodiments, all collected duplicate shipment detection may be transmitted directly to a central data collection component 310 that then inserts the data into a central DS duplicate shipment detection database 320, and analysis of the collected duplicate shipment detection data may only be performed at the distribution system level. Alternatively, there may be MHF duplicate shipment detection databases 220, but no MHF analysis engines 230. In this embodiment, data may be collected at both the MHF and the DS level, but analysis may only be performed at the DS level.

Figure 7:
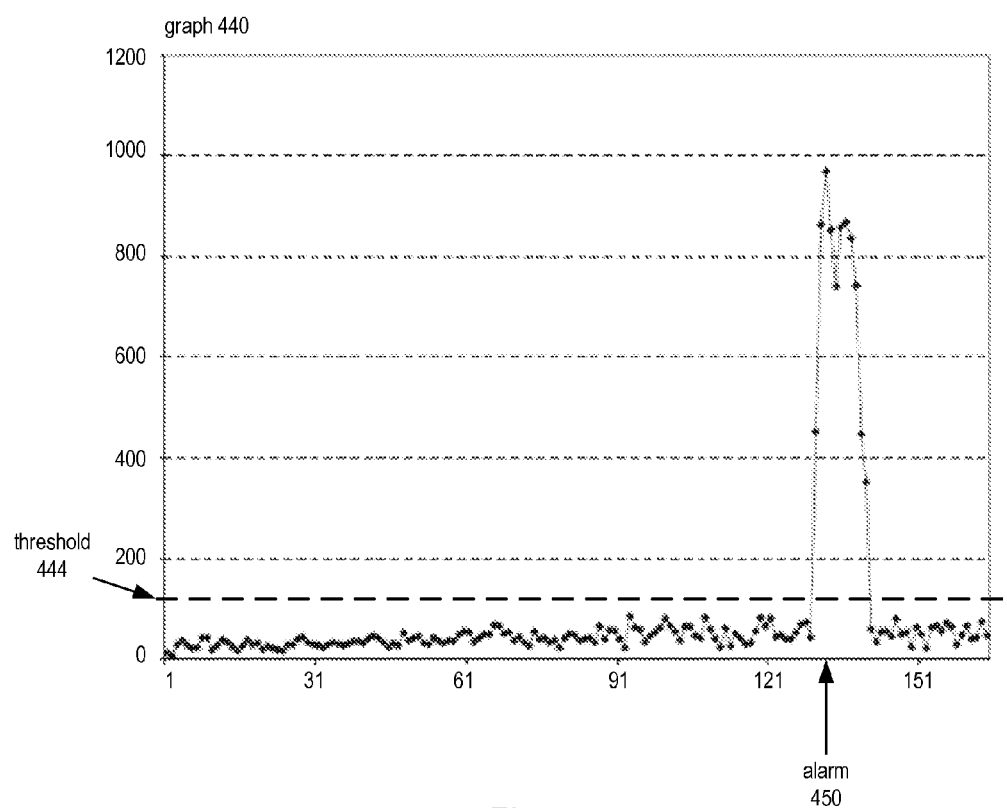
FIG. 7 illustrates an exemplary graph of duplicate shipment detection data for a window according to one embodiment.

FIG. 7 illustrates an exemplary graph of duplicate shipment detection data for a window of approximately 160 analysis intervals according to one embodiment. The graph 440 may be representative of a graph which may be generated by a MHF-level analysis engine 230 as illustrated in FIG. 4 or a graph which may be generated by a DS-level analysis engine as illustrated in FIG. 6. Each point on the graph represents the number of duplicate shipments (destination-identifier/item-identifier combinations) detected in the corresponding analysis interval. In one embodiment, the collected data for the entire window may be examined during an analysis. In other words, for every analysis interval, all new destination-identifier/item-identifier combinations collected in the analysis interval may be examined to determine the number of instances each destination-identifier/item-identifier combination occurred in aggregated data (the window). In one embodiment, a duplicate shipment count is incremented for each destination-identifier/item-identifier combination in the analysis interval that is determined to have occurred more than a specified number of times in the window. In one embodiment, the specified number may be one. In other embodiments, the specified number may be greater than one.

In this example, a threshold 444 may be set at some point above a normal distribution for duplicate shipment counts in an analysis interval. Data may be collected for a period and statistically analyzed to determine a normal distribution, and the threshold 444 may be automatically determined from the statistical analysis. Alternatively, the threshold may be manually set. The threshold may be tunable, as may be the analysis interval and the analysis window, so that the duplicate shipment detection system may be adjusted, for example if false positives tend to raise unnecessary alarms.

An alarm 450 may be raised if the number of duplicate shipments detected in an analysis interval exceeds threshold 444. Alternatively, an alarm 450 may be raised if the number of duplicate shipments detected stays above the threshold for a specified number of analysis intervals. In one embodiment, there may be more than one threshold, for example a low threshold that will raise an alarm if the number of duplicate shipments detected stays above the low threshold for a specified number of analysis intervals, and a high threshold that will raise an alarm immediately if the number of duplicate shipments detected goes above the high threshold.

Figure 8:
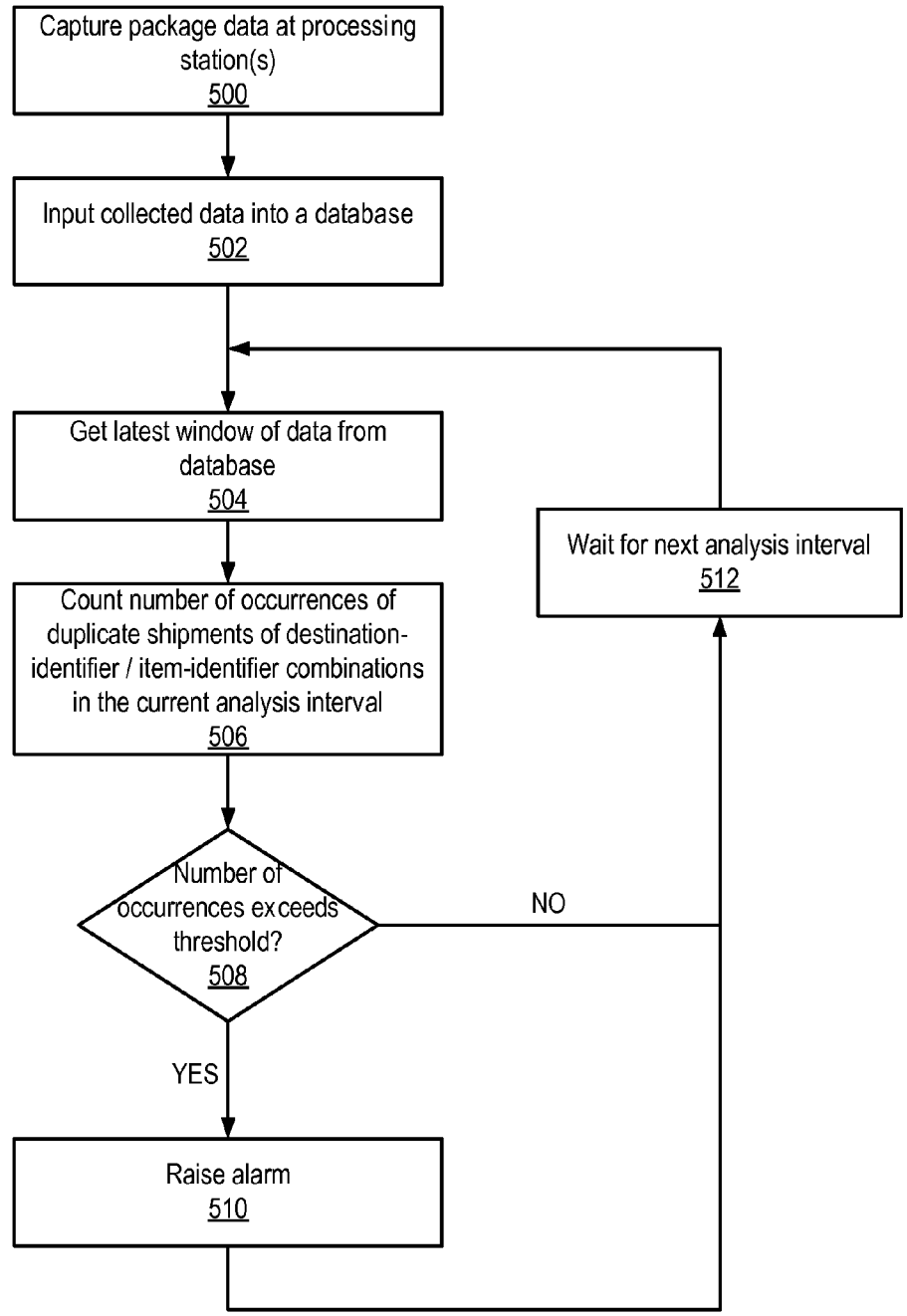
FIG. 8 is a flowchart of a method of duplicate shipment detection at a materials handling facility according to one embodiment.

FIG. 8 is a flowchart of a method of duplicate shipment detection at a materials handling facility according to one embodiment. As indicated at 500, data may be captured from packages being processed at one or more processing stations in a materials handling facility. The collected data may include, but is not limited to, a distribution identifier for each package and one or more item identifiers for each package processed at the processing station(s). The collected data may be input into a duplicate shipment detection database, as indicated at 502. In one embodiment, an aggregator component may collect the data from package messages generated at the processing station(s) and insert the data into the database.

As indicated at 504, an analysis engine may get a latest window of duplicate shipment detection data from the duplicate shipment detection database. The analysis engine may get the latest window of data according to an analysis interval. In other words, the analysis engine may get and analyze a window of data periodically or aperiodically according to the analysis interval. The analysis interval may, for example, be 30 minutes, an hour, or some other interval of time. The window may be some multiple of the analysis interval, for example two weeks, 30 days, etc. In one embodiment, rather than retrieving an entire window (e.g., two weeks) of data, the analysis engine may instead only retrieve the data collected since the last analysis was performed, for example the last 30 minutes of collected data. In this embodiment, previously obtained data may be cached and used during future analyses.

After obtaining the data from the database, the analysis engine may count the number of occurrences of duplicate shipments of destination-identifier/item-identifier combinations in the current analysis interval, as indicated at 506. The collected data for the entire window is examined during an analysis. In other words, for every analysis interval, all new destination-identifier/item-identifier combinations collected in the analysis interval are examined to determine the number of instances each destination-identifier/item-identifier combination occurs in the aggregated data (the window). In one embodiment, a count is incremented for each destination-identifier/item-identifier combination in the analysis interval that is determined to have occurred more than a specified number of times in the window. In one embodiment, the specified number may be one. In other embodiments, the specified number may be greater than one. In one embodiment, instead of counting the number of occurrences of destination-identifier/item-identifier combinations, the analysis engine may perform the count based on a single identifier, such as an address identifier. Other embodiments could be based on combinations of other numbers of various identifiers.

At 508, if the number of duplicate shipments detected in an analysis interval exceeds a threshold, an alarm may be raised, as indicated at 510. Alternatively, an alarm may be raised if the number of duplicate shipments detected stays above the threshold for a specified number of analysis intervals. In one embodiment, there may be more than one threshold, for example a low threshold that will raise an alarm if the number of duplicate shipments detected stays above the low threshold for a specified number of analysis intervals, and a high threshold that will raise an alarm immediately if the number of duplicate shipments detected goes above the high threshold. The alarm may, for example, alert one or more key personnel of the detection of duplicate shipments; the personnel may then take appropriate action to rectify one or more problems that may be causing the generation of duplicate shipments. In one embodiment, additional information may be collected from the package at the processing station(s), and this information may be used to prevent one or more packages containing duplicate shipments from being shipped to the corresponding destination address(es).

After performing an analysis according to the analysis interval and, if necessary, raising an alarm, the analysis engine may then wait for the next analysis interval, as indicated at 512.

Figure 9:
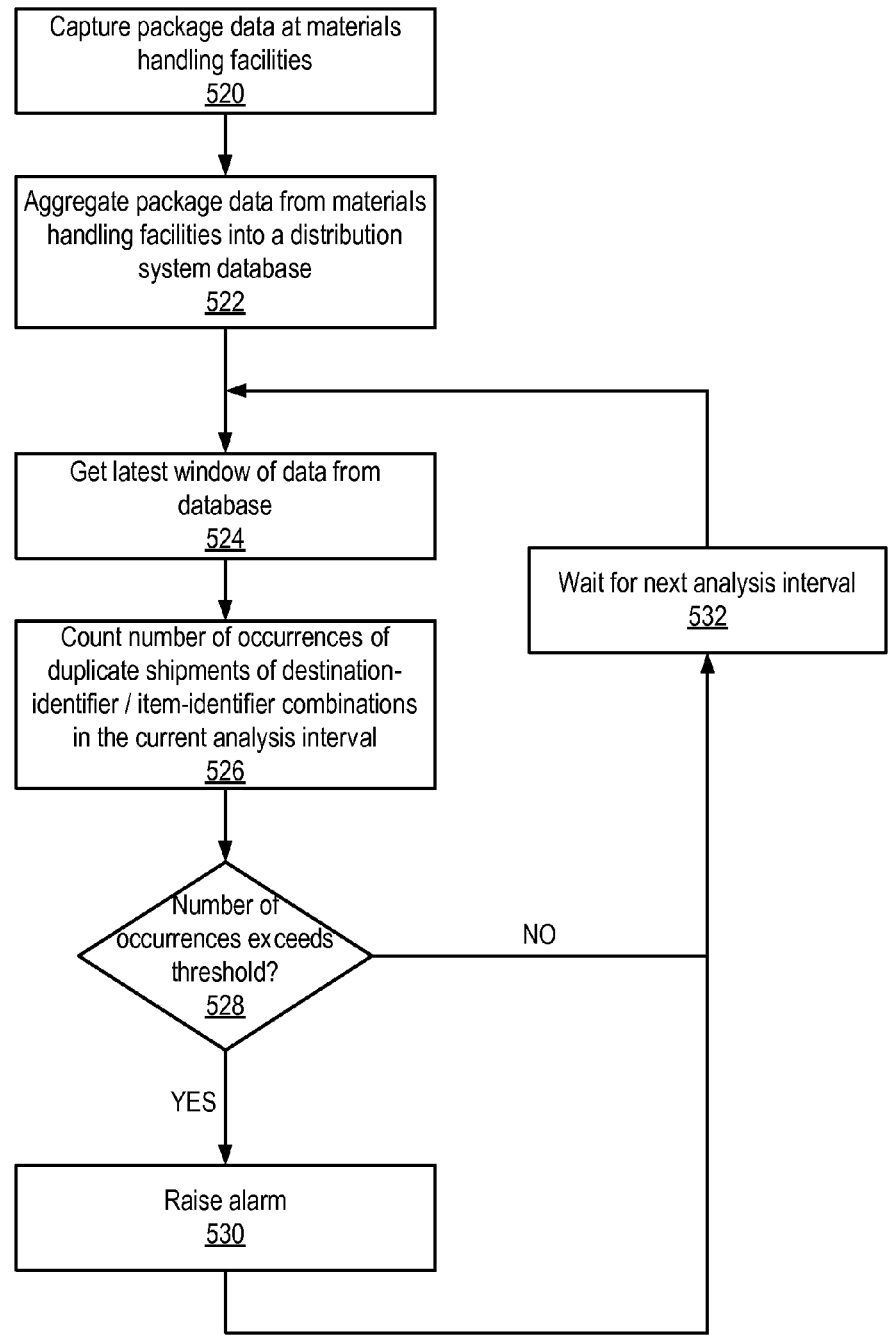
FIG. 9 is a flowchart of a method of duplicate shipment detection in a distribution system including two or more materials handling facilities according to one embodiment.

FIG. 9 is a flowchart of a method of duplicate shipment detection in a distribution system including two or more materials handling facilities according to one embodiment. As indicated at 520, data may be captured from packages being processed at one or more processing stations at two or more materials handling facilities. The collected data may include, but is not limited to, a distribution identifier for each package and one or more item identifiers for each package processed at the processing station(s). The collected data may be aggregated into a distribution system duplicate shipment detection database, as indicated at 522. In another embodiment, a distribution system aggregator component may collect the data from duplicate shipment detection databases at the materials handling facilities and insert the data into the distribution system database. In another embodiment, a distribution system aggregator component may collect the data from package messages generated at the processing station(s) and insert the data into the database.

As indicated at 524, a distribution system analysis engine may get a latest window of duplicate shipment detection data from the distribution system duplicate shipment detection database. The analysis engine may get the latest window of data according to an analysis interval. In other words, the analysis engine may get and analyze a window of data periodically or aperiodically according to the analysis interval. The analysis interval may, for example, be 30 minutes, an hour, or some other interval of time. The analysis window may be some multiple of the analysis interval, for example two weeks, 30 days, etc. In one embodiment, rather than retrieving an entire window (e.g., two weeks) of data, the distribution system analysis engine may instead only retrieve the data collected since the last analysis was performed, for example the last 30 minutes of collected data. In this embodiment, previously obtained data may be cached and used during future analyses.

After obtaining the data from the distribution system database, the distribution system analysis engine may count the number of occurrences of duplicate shipments of destination-identifier/item-identifier combinations in the current analysis interval, as indicated at 526. The collected data for the entire window is examined during an analysis. In other words, for every analysis interval, all new destination-identifier/item-identifier combinations collected in the analysis interval are examined to determine the number of instances each destination-identifier/item-identifier combination occurs in the aggregated data (the window). In one embodiment, a count is incremented for each destination-identifier/item-identifier combination in the analysis interval that is determined to have occurred more than a specified number of times in the window. In one embodiment, the specified number may be one. In other embodiments, the specified number may be greater than one. In one embodiment, instead of counting the number of occurrences of destination-identifier/item-identifier combinations, the analysis engine may perform the count based on a single identifier, such as an address identifier. Other embodiments could be based on combinations of other numbers of various identifiers.

At 528, if the number of duplicate shipments detected in an analysis interval exceeds a threshold, an alarm may be raised, as indicated at 530. Alternatively, an alarm may be raised if the number of duplicate shipments detected stays above the threshold for a specified number of analysis intervals. In one embodiment, there may be more than one threshold, for example a low threshold that will raise an alarm if the number of duplicate shipments detected stays above the low threshold for a specified number of analysis intervals, and a high threshold that will raise an alarm immediately if the number of duplicate shipments detected goes above the high threshold. The alarm may, for example, alert one or more key personnel of the detection of duplicate shipments; the personnel may then take appropriate action to rectify one or more problems that may be causing the generation of duplicate shipments. In one embodiment, additional information may be collected from the package at the processing station(s), and this information may be used to prevent one or more packages containing duplicate shipments from being shipped to the corresponding destination address(es).

After performing an analysis according to the analysis interval and, if necessary, raising an alarm, the distribution system analysis engine may then wait for the next distribution system analysis interval, as indicated at 522.

Illustrative System

Figure 10:
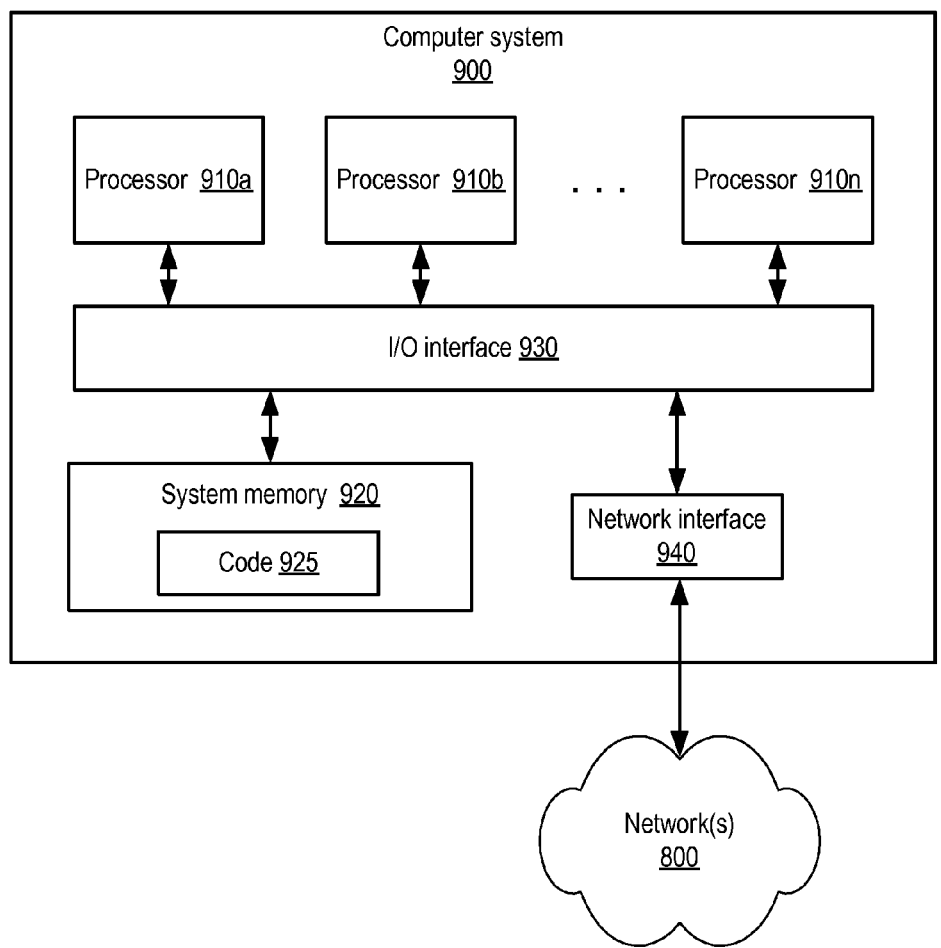
FIG. 10 is a block diagram illustrating an exemplary embodiment of a computer system.

In one embodiment, a system that implements one or more components of a duplicate shipment detection system as described herein may include a general-purpose computer system that includes or is configured to access one or more computer-accessible media, such as computer system 900 illustrated in FIG. 10. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those methods and techniques described above for a duplicate shipment detection system, are shown stored within system memory 920 as code 925.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 800, such as other computer systems or communications devices. The communications channels may include, but are not limited to conventional and mobile telephone and text messaging communications channels. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for FIGS. 1 through 9 for implementing a duplicate shipment detection system. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 900 via I/O interface 930. A computer-accessible medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
    obtaining package data including a destination identifier and one or more item identifiers from packages processed within a distribution system;
    detecting, by one or more computers, duplicate shipments of items to customers, wherein each shipment comprises one or more packages to be shipped to a particular customer at a particular shipping address, wherein each package includes one or more items ordered by a respective customer, and wherein said detecting duplicate shipments comprises:
        analyzing the obtained package data in accordance with an analysis interval, wherein said analyzing comprises, for each destination-identifier/item-identifier combination in each package processed during a most recent analysis interval:
            counting the number of occurrences of the destination-identifier/item-identifier combination in all packages processed during a window, wherein the window includes at least the most recent analysis interval; and
            increasing a duplicate shipment count for the most recent analysis interval in response to determining that the number of occurrences of the destination-identifier/item-identifier combination in the packages processed during the window is greater than a specified number;
        comparing the duplicate shipment count for the most recent analysis interval to a specified threshold to determine if the duplicate shipment count for the most recent analysis interval exceeds the specified threshold; and
    raising an alarm in response to determining that the duplicate shipment count for the most recent analysis interval exceeds the specified threshold, wherein said alarm indicates that at least one duplicate shipment of items has been detected in the most recent analysis interval.

2. The computer-implemented method as recited in claim 1, wherein the specified number is one.

3. The computer-implemented method as recited in claim 1, wherein each destination identifier is a unique customer/shipping address combination, and wherein each item identifier is a unique identifier associated with a particular item carried in inventory of the distribution system.

4. The computer-implemented method as recited in claim 1, wherein said obtaining package data comprises collecting the package data from each package processed at one or more processing stations in the distribution system.

5. The computer-implemented method as recited in claim 4, wherein said obtaining package data further comprises inserting the collected package data into a data store, wherein said analyzing the obtained package data further comprises retrieving at least the package data for the most recent analysis interval from the data store.

6. The computer-implemented method as recited in claim 4, wherein said obtaining package data comprises:
  capturing the package data from each package processed at each of the one or more processing stations;
  transmitting the package data for each package in an electronic message to an aggregator; and
  inserting the package data for each package into a data store.

7. The computer-implemented method as recited in claim 1, further comprising tuning one or more of the threshold, the window, and the analysis interval.

8. The computer-implemented method as recited in claim 1, further comprising tuning the threshold to adjust for false positives or false negatives in accordance with package data obtained for one or more analysis intervals.

9. The computer-implemented method as recited in claim 1, wherein there are two or more specified thresholds, wherein the method further comprises:
  comparing the duplicate shipment count for the analysis interval to each specified threshold; and
  raising an alarm in response to determining that the duplicate shipment count for the analysis interval exceeds one of the specified thresholds, wherein the alarm indicates the particular threshold that was exceeded.

10. The computer-implemented method as recited in claim 1, wherein there are two specified thresholds including:
  a multi-interval threshold above which the duplicate shipment count must remain for two or more analysis intervals before an alarm is raised indicating that the multi-interval threshold has been exceeded; and
  a single interval threshold, wherein detecting that the duplicate shipment count exceeds the single interval threshold in a single analysis interval raises an alarm indicating that the single interval threshold has been exceeded.

11. The computer-implemented method as recited in claim 1, wherein the package data obtained for the packages includes, for each package, one or more of a unique package identifier for the package, a shipment identifier for a shipment including the package, and an order identifier corresponding to a customer order associated with one or more items included in the package.

12. The computer-implemented method as recited in claim 1, further comprising stopping shipment of the at least one duplicate shipment of items that is detected in the most recent analysis interval in response to the alarm being raised.

13. The computer-implemented method as recited in claim 1, wherein the distribution system is a single materials handling facility.

14. The computer-implemented method as recited in claim 1, wherein the distribution system includes two or more materials handling facilities, wherein said obtaining package data for the packages comprises obtaining package data from packages processed at one or more processing stations at each materials handling facility in the distribution system.

15. The computer-implemented method as recited in claim 14, further comprising aggregating the obtained package data from the two or more materials handling facilities, wherein said analyzing is performed on the aggregated package data.

16. The computer-implemented method as recited in claim 14, further comprising performing said analyzing separately on obtained package data for each of the two or more materials handling facilities.

17. The computer-implemented method as recited in claim 14, wherein said analyzing is performed separately on obtained package data for each of the two or more materials handling facilities, the method further comprising aggregating the obtained package data from the two or more materials handling facilities, wherein said analyzing is further performed on the aggregated package data.

18. A system, comprising:
  a processor; and
  a memory comprising program instructions, wherein the program instructions are executable by the processor to implement an analysis engine configured to detect within a distribution system duplicate shipments of items to customers, wherein each shipment comprises one or more packages to be shipped to a particular customer at a particular shipping address, wherein each package includes one or more items ordered by a respective customer, and wherein, to detect duplicate shipments, the analysis engine is configured to:
    analyze a collection of package data in accordance with an analysis interval, wherein said collection of package data is obtained for a plurality of packages within a distribution system, said package data including a destination identifier for each of the plurality of packages and one or more item identifiers for each of the plurality of packages, wherein each destination identifier is a unique customer/shipping address combination, and wherein each item identifier is a unique identifier associated with a particular item carried in inventory of the distribution system, and wherein, to analyze the collection of package data for a most recent analysis interval, the analysis engine is configured to, for each destination-identifier/item-identifier combination in each package processed during the most recent analysis interval:
      count the number of occurrences of the destination-identifier/item-identifier combination in all packages processed during a window, wherein the window includes at least the most recent analysis interval; and
      increase a duplicate shipment count for the most recent analysis interval in response to determining that the number of occurrences of the destination-identifier/item-identifier combination in the packages processed during the window is greater than a specified number; and
    compare the duplicate shipment count for the most recent analysis interval to a specified threshold to determine if the duplicate shipment count for the most recent analysis interval exceeds the specified threshold; and
    raise an alarm in response to determining that the duplicate shipment count for the most recent analysis interval exceeds the specified threshold, wherein said alarm indicates that at least one duplicate shipment of items has been detected in the most recent analysis interval.

19. The system as recited in claim 18, wherein the specified number is one.

20. The system as recited in claim 18, wherein the collection of package data is stored in a data store on a data storage device, and wherein, to analyze the collection of package data for a most recent analysis interval, the analysis engine is further configured to retrieve at least the package data for the most recent analysis interval from the data store.

21. The system as recited in claim 18, wherein the one or more of the threshold, the window, and the analysis interval are configured to be tuned.

22. The system as recited in claim 18, wherein the threshold is configured to be tuned to adjust for false positives or false negatives in accordance with package data from one or more analysis intervals.

23. The system as recited in claim 18, wherein there are two or more specified thresholds, wherein the analysis engine is further configured to:
   compare the duplicate shipment count for the analysis interval to each specified threshold; and
   raise an alarm in response to determining that the duplicate shipment count for the analysis interval exceeds one of the specified thresholds, wherein the alarm indicates the particular threshold that was exceeded.

24. The system as recited in claim 18, wherein there are two specified thresholds including:
   a multi-interval threshold above which the duplicate shipment count must remain for two or more analysis intervals before an alarm is raised indicating that the multi-interval threshold has been exceeded; and
   a single interval threshold, wherein detecting that the duplicate shipment count exceeds the single interval threshold in a single analysis interval raises an alarm indicating that the single interval threshold has been exceeded.

25. The system as recited in claim 18, wherein said collection of package data is obtained from each package as the package is processed at one or more processing stations in the distribution system, wherein the package data further includes, for each package, one or more of a unique package identifier for the package, a shipment identifier for a shipment including the package, and an order identifier corresponding to a customer order associated with one or more items included in the package.

26. The system as recited in claim 18, wherein the distribution system is a single materials handling facility.

27. The system as recited in claim 18, wherein the distribution system includes two or more materials handling facilities, wherein said collection of package data includes aggregated package data obtained from packages processed at one or more processing stations at each materials handling facility in the distribution system, and wherein the analysis engine is further configured to analyze the aggregated package data from the two or more materials handling facilities.

28. A computer-accessible storage medium, comprising program instructions, wherein the program instructions are computer-executable to implement:
   collecting package data including a destination identifier and one or more item identifiers from packages processed at one or more processing stations in a distribution system;
   detecting duplicate shipments of items to customers, wherein each shipment comprises one or more packages to be shipped to a particular customer at a particular shipping address, wherein each package includes one or more items ordered by a respective customer, and wherein said detecting duplicate shipments comprises:
      analyzing the collected package data in accordance with an analysis interval, wherein said analyzing comprises, for each destination-identifier/item-identifier combination in each package processed during a most recent analysis interval:
         counting the number of occurrences of the destination-identifier/item-identifier combination in all packages processed during a window, wherein the window includes at least the most recent analysis interval; and
         increasing a duplicate shipment count for the most recent analysis interval in response to determining that the number of occurrences of the destination-identifier/item-identifier combination in the packages processed during the window is greater than one;
      comparing the duplicate shipment count for the most recent analysis interval to a specified threshold to determine if the duplicate shipment count for the most recent analysis interval exceeds the specified threshold; and
      raising an alarm in response to determining that the duplicate shipment count for the most recent analysis interval exceeds the specified threshold, wherein said alarm indicates that at least one duplicate shipment of items has been detected in the most recent analysis interval.

29. The computer-accessible storage medium as recited in claim 28, wherein each destination identifier is a unique customer/shipping address combination, and wherein each item identifier is a unique identifier associated with a particular item carried in inventory of the distribution system.

30. The computer-accessible storage medium as recited in claim 28, wherein, in said collecting package data, the program instructions are further computer-executable to implement inserting the collected package data into a data store, and wherein, in said analyzing the collected package data, the program instructions are further computer-executable to implement retrieving at least the package data for the most recent analysis interval from the data store.

31. The computer-accessible storage medium as recited in claim 28, wherein, in said collecting package data, the program instructions are further computer-executable to implement:
   capturing the package data from each package processed at each of the one or more processing stations;
   transmitting the package data for each package in an electronic message to an aggregator; and
   inserting the package data for each package into a data store.

32. The computer-accessible storage medium as recited in claim 28, wherein the program instructions are further computer-executable to implement tuning one or more of the threshold, the window, and the analysis interval.

33. The computer-accessible storage medium as recited in claim 28, wherein the program instructions are further computer-executable to implement the threshold to adjust for false positives or false negatives in accordance with package data collected for one or more analysis intervals.

34. The computer-accessible storage medium as recited in claim 28, wherein there are two or more specified thresholds, wherein the program instructions are further computer-executable to implement:
   comparing the duplicate shipment count for the analysis interval to each specified threshold; and
   raising an alarm in response to determining that the duplicate shipment count for the analysis interval exceeds one of the specified thresholds, wherein the alarm indicates the particular threshold that was exceeded.

35. The computer-accessible storage medium as recited in claim 28, wherein there are two specified thresholds including:

a multi-interval threshold above which the duplicate shipment count must remain for two or more analysis intervals before an alarm is raised indicating that the multi-interval threshold has been exceeded; and a single interval threshold, wherein detecting that the duplicate shipment count exceeds the single interval threshold in a single analysis interval raises an alarm indicating that the single interval threshold has been exceeded.

36. The computer-accessible storage medium as recited in claim 28, wherein package data collected from packages at the one or more processing stations in the distribution system further includes, for each package processed, one or more of a unique package identifier for the package, a shipment identifier for a shipment including the package, and an order identifier corresponding to a customer order associated with one or more items included in the package.

37. The computer-accessible storage medium as recited in claim 28, wherein the distribution system is a single materials handling facility.

38. The computer-accessible storage medium as recited in claim 28, wherein the distribution system includes two or more materials handling facilities, wherein said collecting package data from packages processed at one or more processing stations in a distribution system comprises collecting package data from packages processed at one or more processing stations at each materials handling facility in the distribution system.

39. The computer-accessible storage medium as recited in claim 38, wherein the program instructions are further computer-executable to implement aggregating the collected package data from the two or more materials handling facilities, wherein said analyzing is performed on the aggregated package data.

40. The computer-accessible storage medium as recited in claim 38, wherein the program instructions are further computer-executable to implement performing said analyzing separately on collected package data for each of the two or more materials handling facilities.

41. A distribution system, comprising:
one or more computer devices configured to implement an aggregator configured to:
  obtain package data for a plurality of packages within the distribution system, said package data including a destination identifier for each of the plurality of packages and one or more item identifiers for each of the plurality of packages; and
  insert the obtained package data into a data store on a data storage device; and
wherein the one or more computer devices are further configured to implement an analysis engine configured to detect duplicate shipments of items to customers, wherein each shipment comprises one or more packages to be shipped to a particular customer at a particular shipping address, wherein each package includes one or more items ordered by a respective customer, wherein, to detect duplicate shipments, the analysis engine is configured to:
analyze obtained package data from the data store in accordance with an analysis interval, wherein, to analyze obtained package data for a most recent analysis interval, the analysis engine is configured to, for each destination-identifier/item-identifier combination in each of the plurality of packages processed during the most recent analysis interval:
  count the number of occurrences of the destination-identifier/item-identifier combination in all packages processed during a window, wherein the window includes at least the most recent analysis interval; and
  increment a duplicate shipment count for the most recent analysis interval in response to determining that the number of occurrences of the destination-identifier/item-identifier combination in the packages processed during the window is greater than one;
compare the duplicate shipment count for the most recent analysis interval to a specified threshold to determine if the duplicate shipment count for the most recent analysis interval exceeds the specified threshold; and
raise an alarm in response to determining that the duplicate shipment count for the most recent analysis interval exceeds the specified threshold, wherein said alarm indicates that at least one duplicate shipment of items has been detected in the most recent analysis interval.

* * * * *